UNITED STATES PATENT OFFICE.

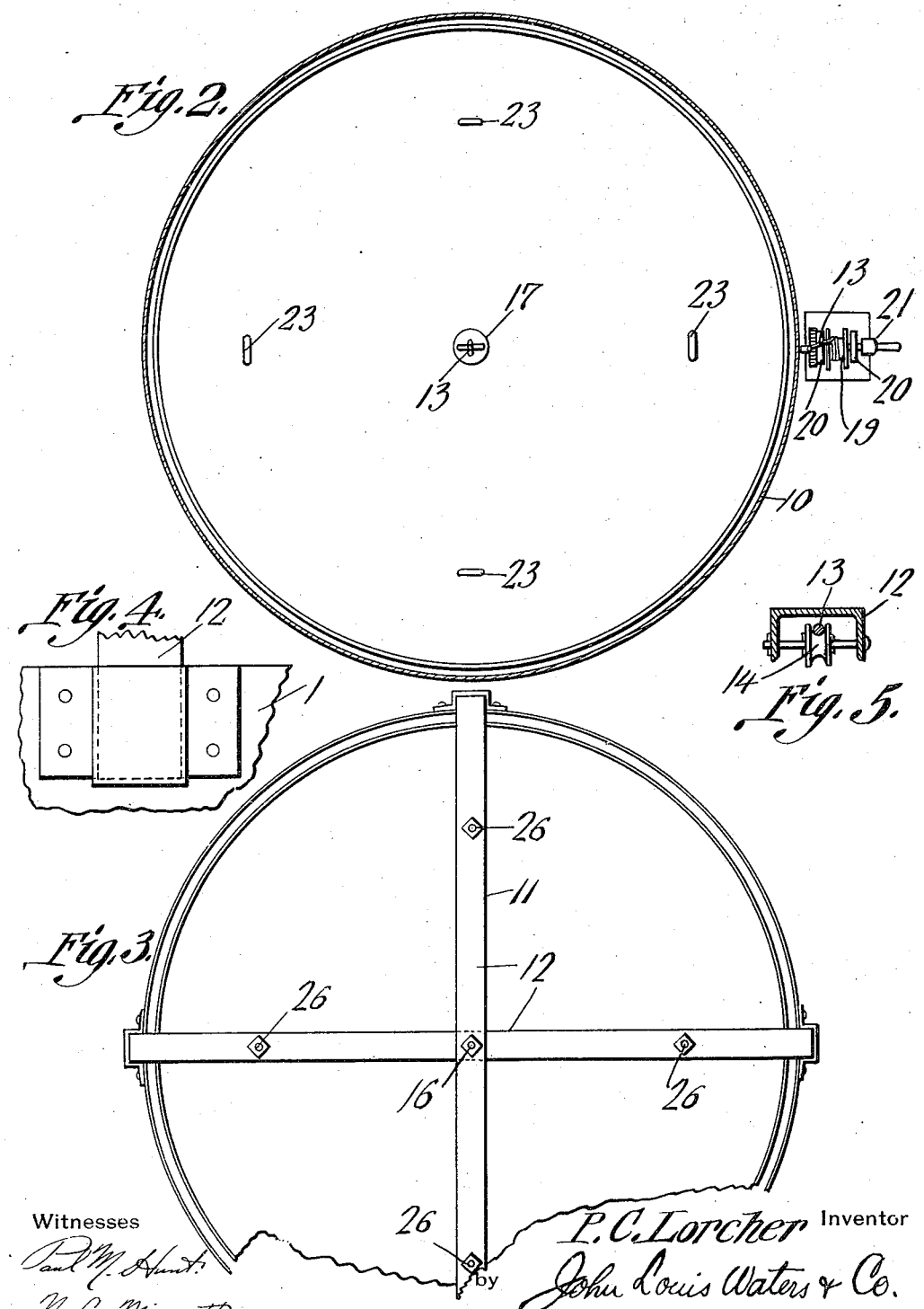

PHILIP C. LORCHER, OF HURON, OHIO.

SILO.

1,244,220.  Specification of Letters Patent.  Patented Oct. 23, 1917.

Application filed April 26, 1916. Serial No. 93,744.

*To all whom it may concern:*

Be it known that I, PHILIP C. LORCHER, a citizen of the United States, residing at Huron, in the county of Erie and State of Ohio, have invented certain useful Improvements in Silos, of which the following is a specification, reference being had therein to the accompanying drawing.

This invention relates to improvements in silos, one object of the invention being the provision of a cover therefor adapted to at all times remain on top of and in contact with the ensilage within the silo so as to maintain the same airtight, and thus in such condition that an exceedingly small percentage is wasted, due to fermentation by contact with the atmosphere.

A further object of this invention is the provision of mechanism for raising and lowering the cover as the ensilage is used.

In the accompanying drawings:

Fig. 2 is a cross section taken on line 2—2 of Fig. 1.

Figs. 3, 4 and 5 are detail views.

Similar characters of reference are employed in all of the above described views, to indicate corresponding parts.

Figure 1:
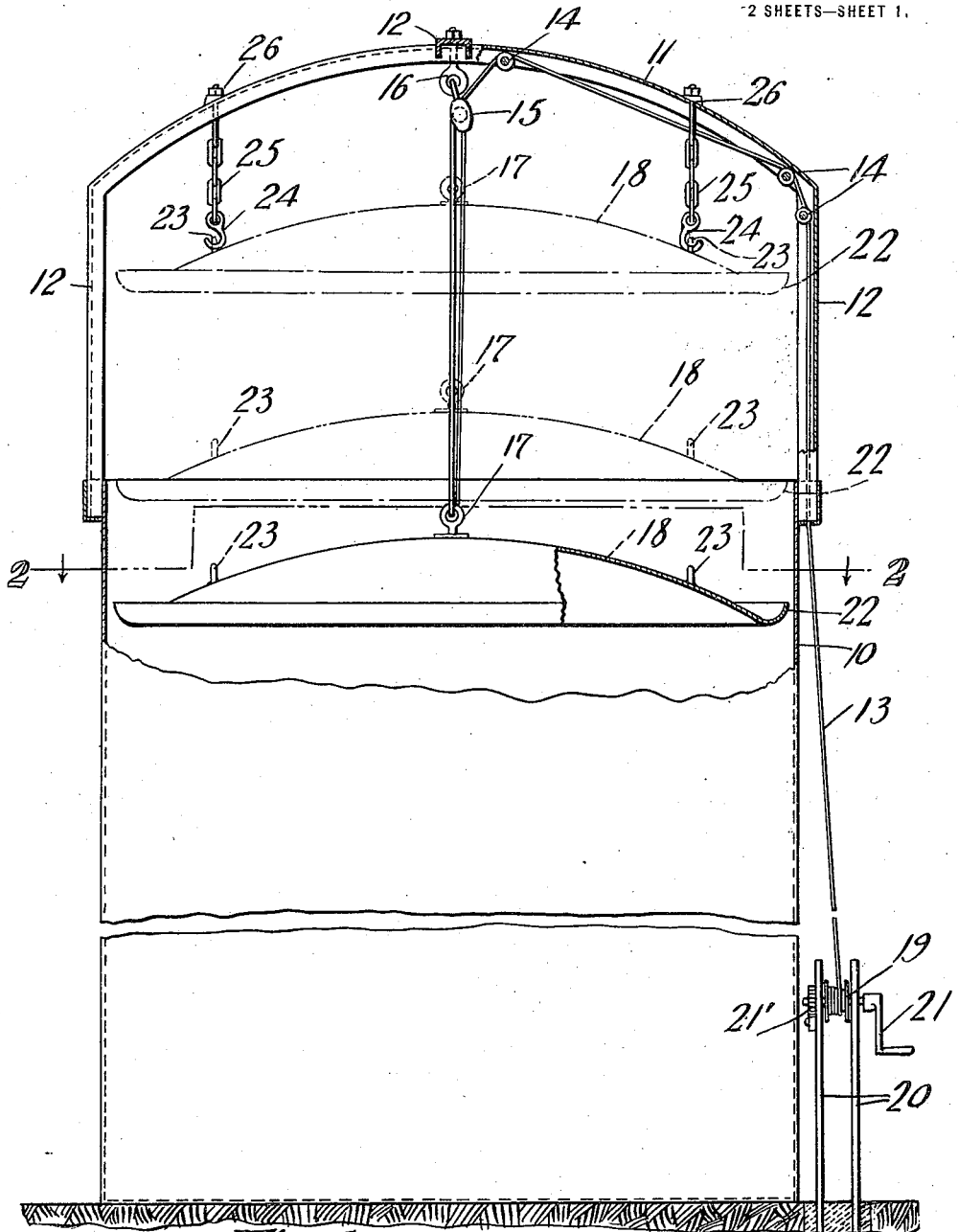
Figure 1 is a vertical central sectional view through a complete silo showing my present invention in use thereon, dotted lines illustrating the position of the cover when the silo is filled, the full lines indicating the position when the cover is partially lowered.

Referring now, more particularly, to the accompanying drawings I provide a cylindrical body 10 while a supporting spider 11 is mounted in spaced relation on the upper end of the body by means of supporting brackets 12, carried by the outer surface of the body. As will be noted, the spider is preferably constructed of cross arms, channel shaped in cross section, the outer ends of the arms being bent downwardly and arranged in close relation with the surface of the body to effect the maintenance of the main part of the spider in spaced relation to the body.

One of these brackets 12 is open at its lower end to permit of the passage therethrough of the cable 13 which passes over the pulleys 14 and a sheave in the pulley block 15 which is supported from the eye bolt 16 depending centrally from and within the spider 11.

This cable has one end connected to the pulley block 15 and is extended through the eye 17 attached to the cover 18, while the opposite end is connected to a windlass 19 mounted in the supports 20 exteriorly of the silo 10, a crank 21 being provided so that the cable may be controlled to permit of the raising and lowering of the cover 18.

This cover is of slightly less diameter than the interior of the silo 10 and is preferably a concaved disk or plate provided with an upstanding rim 22 which forms a receptacle for any moisture accumulated upon the top of the cover and which would have a tendency to injure the ensilage.

The cover 18 is further provided with the eyes or bails 23 which are adapted to receive the hooks 24 of the depending chains 25, such chains being attached at 26 to the spider on the silo, so that the cover may be permanently supported at the top when the silo is being filled or when it is filled.

From the foregoing description, it is evident that as the ensilage is removed from the silo in use, the chains may be disconnected from the cover 18 and through the instrumentality of the drum 19 which is controlled by the ratchet 21', such cover may be lowered to rest upon the top of the ensilage and thus protect the same from the air.

Where so desired the cover may be weighted to insure of the proper close fit thereof.

It will be understood that in the present embodiment, the body is constructed of wood and is slightly spaced from the edge of the cover to permit of shrinkage, but when the body is formed of metal these parts are arranged in close relation with each other.

What I claim as new is:—

A silo including a body, an open support mounted on and arranged in spaced relation to the upper edge of the body, a cover mounted for vertical movement in the body and provided with moisture receiving means, and means operatively connected to the support and operatively associated with the cover for raising and lowering the cover.

In testimony whereof I affix my signature.

PHILIP C. LORCHER.

Copies of this patent may be obtained for five cents each, by addressing the "Commissioner of Patents, Washington, D. C."